Patented Nov. 28, 1939

2,181,476

UNITED STATES PATENT OFFICE 2,181,476

ALIPHATIC HYDROXY-ETHER KETONES

Albert Frank Bowles, Jersey City, and Saul Kaplan, Teaneck, N. J., assignors to The Richards Chemical Works, Incorporated, Jersey City, N. J., a corporation of New Jersey No Drawing. Application June 12, 1936,
Serial No. 84,896

7 Claims. (Cl. 260—458)

This invention relates to the production of assistants for use in the processing and treatment of pelts, furs, leather and textiles, and intermediates for the manufacture of such assistants and other uses. Many of the compounds, both the final products and also the intermediates, are new per se, apart from any use to which they may be put.

We have discovered that an alkylene oxide will react with an aliphatic or aromatic aldehyde to form an hydroxy ketone of the following structure:

$$R_1-\underset{\underset{O}{\|}}{C}-R_2-OH$$

where $R_1$ signifies the aromatic or aliphatic nucleus and $R_2$ signifies the radical of the alkylene oxide.

The reaction involves the breaking of the heterocyclic ring of the alkylene oxide at the oxygen atom, so that the latter has a free bond to unite with the hydrogen of the aldehyde group. The free carbon bond of the oxide links itself to the carbon of the aldehyde group. This is illustrated below:

Acetaldehyde + Ethylene oxide

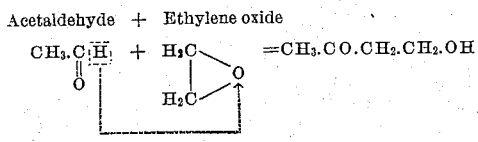

The reaction may be typified as follows:

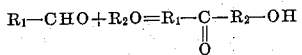

We have discovered that if two molecular equivalents of the alkylene oxide are used to each molecular equivalent of the aldehyde, the additional equivalent of the alkylene oxide adds itself to the first alkylene oxide group, which in turn is attached to the aliphatic or aromatic aldehyde nucleus, as indicated below:

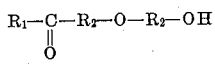

More generally:

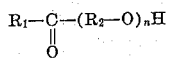

where $n$ may be any number from 1 to 2, 4, 10 or more.

Practically any compound containing an aldehyde group may be used, such as the following:

(1) Aliphatic aldehydes, saturated or unsaturated, straight or branched chain, containing from 3, or preferably 5, to 20 carbon atoms.
(2) Aliphatic hydroxy aldehydes with the above number of carbon atoms, such as glyceric aldehyde and the aldoses.
(3) Aliphatic aldehyde acids with the above number of carbon atoms, such as 1, carboxyoctanal.
(4) Aromatic aldehydes, such as benzaldehyde, cinnamic aldehyde.
(5) Aromatic hydroxy aldehydes, such as hydroxy benzaldehyde, salicyl aldehyde, anisic aldehyde and vanillin or its homologues.

The reactions noted above require a temperature of around 120 to 200° C. to bring them to completion. This involves the use of either an autoclave or a reflux condenser for the reason that the lower members of the alkylene oxide series are readily volatile. For example, propylene oxide boils at 35° C. and butylene oxide at 51° C. The products of the reaction between such oxides and the hydroxy or aldehyde compounds are, however, substantially non-volatile.

Using an autoclave, the reacting substances are introduced cold, the autoclave is closed and then heated to between 120° and 200° C. The volatilization of the oxide raises the pressure, but, owing to the non-volatile character of the reaction product, as soon as the reaction is complete, the pressure drops substantially to zero. This fact provides a convenient method for determining the end point of the process.

Using a reflux condenser, the oxide vaporized at the beginning of the reaction is returned to the reaction vessel. As the reaction proceeds, the temperature is raised until refluxing ceases at around 180° C.

The reactions noted above may be aided by means of a suitable catalyst, such as an alkali hydroxide, acetate or borate, a mineral acid, or aluminum, calcium, ferric or zinc chloride. The use of such a catalyst enables the reaction to be carried out at a considerably lower temperature (and hence pressure) than is possible where no catalyst is used. The use of a catalyst also reduced side reactions to a minimum.

The properties of the foregoing compounds which make them valuable in the processing or treatment of leathers, pelts, furs and textiles may be enhanced by their sulfation, or both sulfation and sulfonation in the case of products having an aromatic group or nucleus. This is especially true of properties requiring water solubility for their action, such as penetrating, detergent and wetting properties.

The temperature of the reacting mixture should be kept down by suitable cooling means to below 80° C., and preferably below 30° C. The mixture is stirred until it becomes water-soluble. This usually requires three hours or more.

If the hydroxy ketone or like product contains an aromatic group or nucleus, like phenyl, then such group will be sulfonated at the same time that sulfation occurs at the hydroxyl group. In such cases the quantity of sulfuric acid added should be two equivalents, or more, instead of only one.

While the sulfated compounds may be made by first reacting the alkylene oxide and the aldehyde compound and then, as a separate step, sulfating the product, such procedure is not essential. The process may be made a one-step process by adding the sulfuric acid to the initial reacting materials. Alternatively, the hydroxy material may be sulfated and then treated with alkylene hydroxide.

What is claimed is:

1. A hydroxy-ether ketone selected from the group consisting of compounds having the formula:

wherein $R_1$ is an alkyl radical having from 3 to 20 carbon atoms, $R_2$ is an alkylene radical and $n$ is 2 to 10.

2. A leather and textile processing assistant comprising the sulfuric acid derivative of a hydroxy-ether ketone selected from the group having the formula:

wherein $R_1$ is an alkyl radical having from 3 to 20 carbon atoms, $R_2$ is an alkylene radical and $n$ is 2 to 10.

3. The process comprising reacting at least two mols of an alkylene oxide with one mol of an aldehyde having from 3 to 20 carbon atoms, to produce a hydroxy-ether ketone of the following formula:

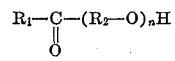

wherein $R_1$ is an alkyl radical having from 3 to 20 carbon atoms, $R_2$ is an alkylene radical and $n$ is 2 to 10.

4. A hydroxy-ether ketone having the general formula

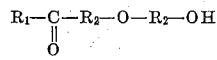

wherein $R_1$ is an alkyl radical having from 3 to 20 carbon atoms, and $R_2$ is an alkylene radical.

5. The process comprising reacting two mols of an alkylene oxide with one mol of an aldehyde having from 3 to 20 carbon atoms, to produce a hydroxy-ether ketone of the following formula

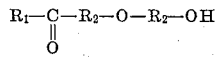

where $R_1$ is an alkyl radical having from 3 to 20 carbon atoms, and $R_2$ is an alkylene radical.

6. The process comprising reacting four mols of an alkylene oxide with one mol of an aldehyde having from 3 to 20 carbon atoms, to produce a hydroxy-ether ketone of the following formula:

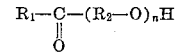

wherein $R_1$ is an alkyl radical having from 3 to 20 carbon atoms, $R_2$ is an alkylene radical and $n$ is 4.

7. The process comprising reacting ten mols of an alkylene oxide with one mol of an aldehyde having from 3 to 20 carbon atoms, to produce a hydroxy-ether ketone of the following formula:

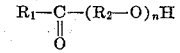

wherein $R_1$ is an alkyl radical having from 3 to 20 carbon atoms, $R_2$ is an alkylene radical and $n$ is 10.

ALBERT FRANK BOWLES.
SAUL KAPLAN.